United States Patent
Wilson, Jr. et al.

(10) Patent No.: US 7,802,721 B2
(45) Date of Patent: Sep. 28, 2010

(54) METHOD AND SYSTEM FOR TRANSFERRING CAPTURED IDENTIFICATION DATA IN SELECTABLE FORMATS SUITABLE FOR DIFFERENT RECIPIENTS

(75) Inventors: Sidney Wilson, Jr., Jackson, TN (US); Steven D. Herren, Caruthersville, MS (US)

(73) Assignee: Wilson Technologies, Inc., Clawson, MI (US)

( * ) Notice: Subject to any disclaimer, the term of this patent is extended or adjusted under 35 U.S.C. 154(b) by 0 days.

(21) Appl. No.: 12/351,077

(22) Filed: Jan. 9, 2009

(65) Prior Publication Data

US 2009/0114720 A1    May 7, 2009

Related U.S. Application Data

(63) Continuation of application No. 10/154,941, filed on May 24, 2002, now abandoned.

(51) Int. Cl.
G06K 5/00 (2006.01)
(52) U.S. Cl. .................. 235/380; 235/487; 235/492
(58) Field of Classification Search ............. 235/380, 235/487, 492, 451, 375; 705/23
See application file for complete search history.

(56) References Cited

U.S. PATENT DOCUMENTS

| | | | |
|---|---|---|---|
| 6,311,169 B2 | 10/2001 | Duhon | |
| 6,633,223 B1 * | 10/2003 | Schenker et al. | 340/5.53 |
| 6,854,642 B2 | 2/2005 | Metcalf et al. | |
| 6,988,085 B2 | 1/2006 | Hedy | |
| 2002/0000468 A1 * | 1/2002 | Bansal | 235/462.15 |
| 2003/0128866 A1 * | 7/2003 | McNeal | 382/115 |
| 2003/0220804 A1 | 11/2003 | Wilson, Jr. et al. | |
| 2004/0030608 A1 * | 2/2004 | Wen et al. | 705/26 |

OTHER PUBLICATIONS

Marianne Means, Protected ID Card A "Smart Idea", Nov. 29, 2001, Seattle Post, p. B.7.
David Churchill, Hand it to Them; The Business End; Travel, May 1, 1994, The Times, London (UK).

* cited by examiner

*Primary Examiner*—Edwyn Labaze
(74) *Attorney, Agent, or Firm*—Brooks Kushman P.C.

(57) ABSTRACT

A method and system include a data capture device and scan, record, and report (SRR) logic. The data capture device captures identification data from a card having identification data elements such that the captured identification data includes the identification data elements. The SRR logic receives the identification data and receives requests pertaining to the card from a user of the data capture device. The SRR logic selects a set of the identification data elements in response to a first request and transfers the first set of identification data elements with the first request to a first recipient responsible for handling the first request. The SRR logic selects a different set of the identification data elements in response to a second request and transfers the second set of identification data elements with the second request to a second recipient responsible for handling the second request.

20 Claims, 10 Drawing Sheets

SRR
SWilson, Inc.

NAME

ADDRESS

DRIVER LICENSE NUMBER

SOCIAL SECURITY NUMBER

GENDER

DATE OF BIRTH

Is Data Correct?   YES   NO

FIG. 5

SRR
SWilson, Inc.

ENTER EMPLOYEE NUMBER: ___ 182

CLIENT NAME
CLIENT ADDRESS
CLIENT SOCIAL SECURITY NUMBER

ADDITIONAL INFORMATION FOR CLIENT:

GENDER ___ 184

DATE OF BIRTH ___ 186

PRODUCT ___ 188

COMMENTS ___ 190

SRR
SWilson, Inc.

PERIOD OF REPORT [mm/dd/yy] — 260
THROUGH [mm/dd/yy] — 262

DAY OF WEEK/GENDER

| | MALE | FEMALE |
|---|---|---|
| MONDAY | 25 — 232 | 23 — 246 |
| TUESDAY | 25 — 234 | 20 — 248 |
| WEDNESDAY | 12 — 236 | 10 — 250 |
| THURSDAY | 25 — 238 | 25 — 252 |
| FRIDAY | 25 — 240 | 25 — 254 |
| SATURDAY | 3 — 242 | 30 — 256 |
| SUNDAY | 2 — 244 | 15 — 258 |

METHOD AND SYSTEM FOR TRANSFERRING CAPTURED IDENTIFICATION DATA IN SELECTABLE FORMATS SUITABLE FOR DIFFERENT RECIPIENTS

CROSS-REFERENCE TO RELATED APPLICATIONS

This application is a continuation of U.S. application Ser. No. 10/154,941, filed May 24, 2002.

BACKGROUND OF THE INVENTION

1. Field of the Invention

The present invention relates generally to the field of reporting systems and methods, and more particularly to systems and methods for capturing identification data of consumers, obtaining additional data from remote databases, and processing the identification data and the additional data to create reports.

2. Background Art

Many types of businesses use the internet to expedite business transactions. For example, retail businesses typically employ data capture devices, for example magnetic stripe readers, to facilitate product purchases in the retail environment. Typically, a consumer presents a cashier with a credit card that includes a magnetic strip. The magnetic strip contains information about the consumer who is making the purchase, for example, the consumers name, the consumer's credit card number and the expiration date of the credit card.

Typically, the magnetic strip reader employed by the cashier interfaces with a system that retrieves and formats the data. The data is then transmitted to a remote device that receives and processes the data transmitted by the cashier's system. The remote device transmits to the cashier's system an indication of whether the credit card used by the consumer is approved.

Moreover, in many retail businesses, for example auto dealerships or large appliance retailers, there exists a need to capture identification data of a consumer for other purposes. For example, in order for an automobile dealer to allow a consumer to test drive a vehicle, the dealer preferably ensures that the consumer has a valid driver's license. This is typically achieved by simply retrieving the license from the consumer and recording a copy of the license for insurance purposes. In addition, an automobile dealership may desire to capture identification data and obtain credit approval from loan agencies or banks.

SUMMARY OF THE INVENTION

Generally, the present invention provides a reporting system that includes a data capture device configured to electronically capture identification data about a consumer from an identification card. The system is communicatively connected to a database server that is configured to receive an information request from the data capture device that contains the identification data. The database server is further configured to transmit an information response related to the identification data received. The reporting system further includes scan, record, and report (SRR) logic configured to store the identification data, transmit the information request to the database server, receive the information response from the database server, and create business summary reports.

The present invention also encompasses a method for reporting business data related to captured identification data.

The method can be broadly conceptualized by the following steps: capturing identification data; transmitting an information request; receiving an information response; and creating business summary reports based on the information response received.

Other aspects of the system and method of the present invention, and other features and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

The present invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the figures.

FIG. 5 is a web form used in connection with a preferred embodiment of the present invention for displaying captured identification data.

FIG. 7 is a web form used in connection with a preferred embodiment of the present invention for entering additional information regarding a transaction.

FIG. 9 is a web form used in connection with a preferred embodiment of the present invention for reporting "Day of the Week/Gender".

DETAILED DESCRIPTION OF THE PREFERRED EMBODIMENT(S)

In general, the present invention provides a system and method for capturing consumer identification data and creating reports from the data captured. The system of the present invention captures the identification data, and the identification data is used in order to retrieve additional data about the consumers from a remote database. The identification data and the additional data are stored in a relational database, and the system is configured to allow a user to request a variety of reports from the data stored.

Figure 1:
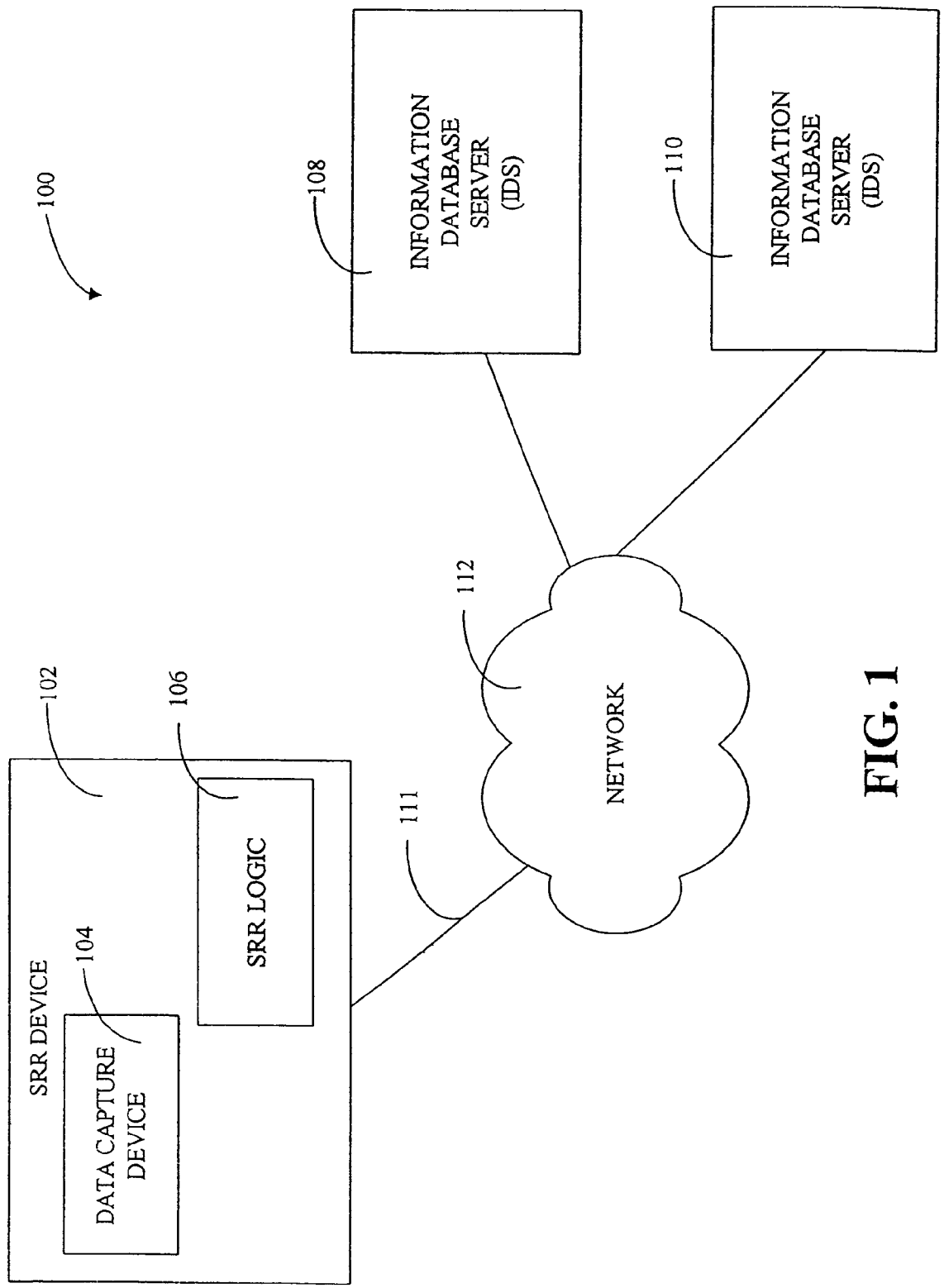
FIG. 1 is a block diagram illustrating a reporting system of the present invention.

A reporting system 100 of the present is depicted in FIG. 1. System 100 preferably includes a scan, record and report device (hereinafter referred to as SRR device) 102, which is connected to a network 112, and at least one information database server (IDS) 108, 110.

IDS 108, 110 each includes at least one database that accepts formatted queries and replies accordingly. For example, Experian™, Equifax™, SecureTech™, and LiquidCredit™ are Internet services that provide remote access to data. Each service receives a database request, and the service transmit additional data, such as personal data verification and credit approval, in response to the request.

SRR device 102 communicates with IDS 108, 110 over a network 112. Network 112 may include an integrated services digital network (ISDN), a local area network (LAN), a wide area network (WAN), or any other type of network that allows two devices to communicate. SRR device 102 can be connected via connection 111 to a network or to an internet service provider via a T1 or a T3 connection, via digital subscriber lines (DSL), via a dial-up connection, or wirelessly.

A data capture device 104 of SRR device 102 captures identification data of a consumer, including a client's social security number, driver's license number, address, and name. SRR logic 106 of SRR device 102 stores the captured data, formats the data, then transmits an information request to IDS 108 that includes the data captured. IDS 108 receives and processes the information request. IDS 108 then transmits responsive information to SRR device 102 that contains addition information related to the consumer for which IDS 108 received identification data.

Figure 2:
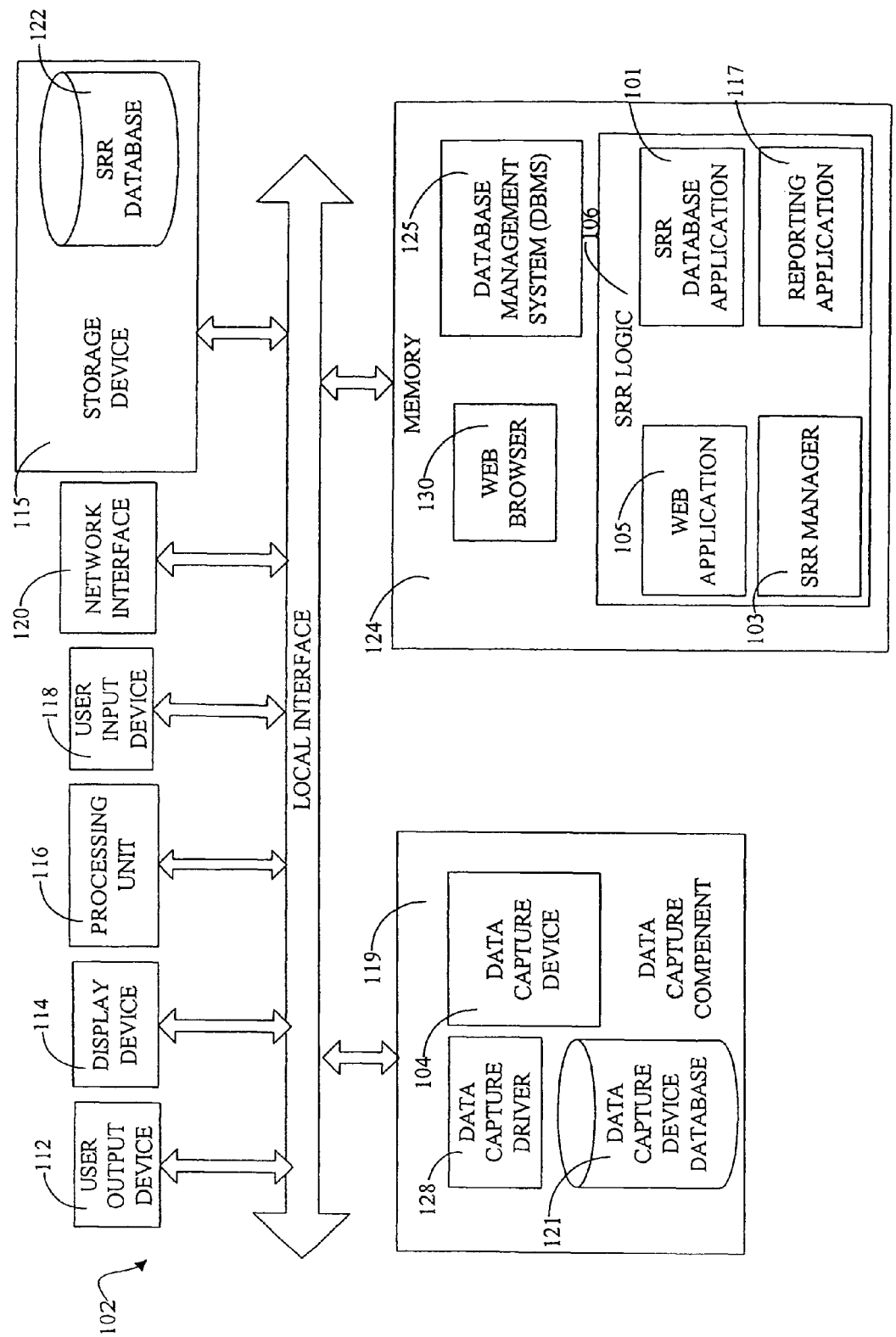
FIG. 2 is a block diagram illustrating an SRR device of a preferred embodiment of the present invention as shown in FIG. 1.

FIG. 2 depicts the preferred embodiment of SRR device 102 as illustrated in FIG. 1 and discussed above. SRR device 102 includes a data capture component 119 having data capture device 104 and a data capture driver 128. Data capture driver controls data capture device 104. Data capture driver 128 can be implemented in software, hardware, or a combination thereof.

Preferably, data capture device 104 retrieves identification data from a government-issued identification card, such as a driver's license. Data capture device 104 can include an optical character recognition (OCR) scanner, such as BizCardReader™ and CardScan™. Data capture device 104 can include a magnetic strip reader configured to retrieve data from a magnetic strip placed on a government issued identification card. For example, Magscan™ or Miniwedge™ magnetic strip readers are suitable for retrieving identification data. Further, data capture device 104 can include a bar code reader configured to retrieve identification data from a government issued identification card that includes a bar code. A Voyager™ handheld scanner and a Cyclone™ handheld scanner are examples of bar code readers that are configured to retrieve identification data from a bar code. In addition, data can be entered manually via a keyboard or other input device.

Moreover, data capture component 119 preferably includes a data capture device database 121. Data capture device database 121 stores the identification data retrieved from the government issued identification card by data capture device 104.

Further, in the embodiment in FIG. 2, SRR device 102 includes a display device 114, such as a monitor, and a user input device 118, for example a keyboard, a mouse, or a microphone. SRR logic 106 controls the data formatting, data storage, and data transmittal and receipt of SRR device 102, and in the embodiment shown in FIG. 2, SRR logic 106 is software stored in memory 124.

SRR logic 106, when implemented in software, can be stored and transported on any computer-readable medium for use by or in connection with an instruction execution system, apparatus, or device, such as a computer-based system, processor-containing system, or other system that can fetch and execute instructions. In the context of this document, a computer-readable medium can be any mechanism that can contain, store, communicate, propagate, or transport a program for use by or in connection with the instruction execution system, apparatus, or device. The computer-readable medium can be, for example but not limited to, an electronic, magnetic, optical, electromagnetic, infrared, or semiconductor system apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CDROM). The computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory. As, for example, SRR logic 106 may be magnetically stored and transported on a conventional portable computer diskette.

An embodiment of SRR device 102 of FIG. 2 includes one or more system processing units 116, such as a digital signal processor (DSP) or a central processing unit (CPU), that communicate to and drive the other elements within SRR device 102 via a local interface, which can include one or more system buses. In addition, the preferred embodiment of SRR device 102 shown in FIG. 2 includes data capture device 104, which captures identification data, and a corresponding data capture device driver 128 stored in memory 124 that controls data capture device 104. Data capture device driver 128 can be implemented in software, hardware, or a combination thereof.

Further stored in memory 124 is a web browser 130, which locates and displays web pages to display device 114. Web browser 130 can be implemented in software, hardware, or a combination thereof, and is capable of displaying both text and graphics to display device 114. For instance, web browser 130 can be Netscape Navigator™ or Internet Explorer™.

The preferred embodiment of SRR device 102 in FIG. 2 depicts SRR logic 106 stored in memory 124 including a web application 105, a database application 101, a reporting application 117, and an SRR manager 103. SRR logic 106 can be implemented in programming languages including C, C++, Java, VB script, or other compiled or interpreted programming languages. Although the embodiment shown in FIG. 2 of SRR logic 106 includes these components, SRR logic 106 is not limited to these components. Further, although FIG. 2 depicts these components as co-resident, each application could be stored and executed on a dedicated server, thereby allowing resource distribution over multiple hardware components. For example, web application 105 could be stored and executed on a dedicated web server.

Moreover, in the preferred embodiment depicted in FIG. 2, SRR device 102 includes a storage device 115. Storage device 115 can include a hard disk drive, which is resident on SRR device 102. In addition, however, storage device 115 can include tape drives, or other external storage device devices. Storage device 115 preferably stores an SRR database 122 that contains the identification information retrieved from data capture device 104, in addition to response information received from IDS 108 over network 112. SRR database 122 stores structured data that is accessible by the DBMS (Database Management System) 125 in memory 124.

DBMS 125 and associated methodology is preferably a relational database that allows access to the information stored in storage device 115. The architecture of SRR device 102 defines the type of relational database employed. For example, industrial strength relational databases include Oracle™, Microsoft SQL Server, or Informix™, which can be implemented on UNIX-based systems. In addition, PC-based TM SRR devices can include relational databases, for example Microsoft Access FoxPrO™ or Dbase™.

Data capture device 104 of data capture component 119 receives identification data when a user elects to scan, swipe a magnetic strip, or scan a bar code of a government issued identification card. Data capture driver 128 stores the data in data capture device database 121.

Preferably, web application 105 retrieves the identification data captured by the scan of the government issued identification card from data capture device database 121. Web application 105 displays the data in a web form through web browser 130 to display device 114. Preferably, SRR database application 101 retrieves the information from the web form via web application 105 and interfaces with DBMS 125 to store the identification data in SRR database 122 stored on storage device 115.

Identification data preferably includes data retrievable from a government-issued identification card. Types of identification data include a consumer's name, social security number, address, and driver's license number. The format and placement of data on identification cards varies with the type of card being scanned. However, scanning technologies, for example the OCR scanners, retrieve the data by recognizing the format of each piece of data and saving the data to its data capture device database 121 in fields that indicate the nature of each piece of data scanned. SRR device 102 then formats the data that is displayed to a user in a web form created by web application 105. A web form is a structured web page with predefined areas for entering or changing information.

Preferably, once the data is written to the web form by web application 105, the user reviews the data and makes a decision to submit the data to a remote IDS 108. Submission to a remote IDS 108 allows the user to obtain additional information regarding the consumer, for example validity of the government-issued identification card used in the scan or an approval amount for a credit line from a credit or banking institution.

If the user chooses to submit the data to an IDS 108, SRR manager 103 formats the identification data obtained from data capture device 104 and displays to display device 114 in a web form to conform to a service that the user requests. For example, a user may submit an affirmative credit application to a financial institution. As such, SRR manager 103 formats the identification data according to a format specification, for example for a financial institution that provides an on-line credit approval service.

SRR manager 103 then transmits the information request that contains the formatted data. If the user requests credit approval, then the data transmitted to IDS 108 over network interface 120 will include an indication that credit approval is sought and the identification data that allows IDS 108 to obtain credit approval. For example, various credit services process a credit approval request that includes the consumer's name, address and social security number.

After the request is processed by IDS 108, IDS 108 preferably transmits an information response to SRR device 102 that includes data relating to the consumer's credit rating and whether IDS 108 approves a loan for the consumer. In many instances, the financial institution transmits data indicating that the consumer has been approved, has received conditional approval, or has been declined for the specific application submitted. SRR manager 103 receives this information response, and SRR database application 101 interfaces with DBMS 125 and stores the data received in SRR database 122.

In addition to employing SRR device 102 to obtain credit approval for a consumer, SRR device 102 may also be employed as a credit pre-screening mechanism. In other words, a user can scan a consumer's government issued identification card, such as a driver's license, with data capture device 104, and transmit the identification data to an IDS 108 that performs credit pre-screening, for example a financial institution. IDS 108 performs a pre-screening process on the identification and then transmits an information response to SRR device 102 that includes an indication of pre-approval. The user can then inform the consumer that he/she has been pre-approved for credit from the financial institution. In addition, the financial institution can inform the consumer that he/she has been pre-approved, either via U.S. mail or other mode of correspondence.

As indicated herein, SRR device 102 can further be employed to verify and authenticate the government issued identification card. For example, the user of SRR device 102 scans an identification card with data capture device 104. SRR manager 103 of SRR device 102 receives the identification data from data capture device 104 and transmits identification data to an IDS 108. Moreover, IDS 108 is configured to receive the identification data and perform verification and authentication on the identification data received from SRR device 102. The identification information transmitted from SRR device 102 may include a driver's license number, a social security number, a name, an address, or any combination of the identification. In particular, the verification and authentication can be performed on only a driver's license number. The more identification data provided to the IDS 108 that is configured to verify and authenticate government issued identifications, the more accurate the result obtained. IDS 108 then transmits to SRR device 102 an indication of whether the identification data verified and authenticated was found in the remote database of IDS 108. Such information is useful, for example at a car dealership, because many insurance carriers require a government issued identification, such as a driver's license, as a condition to covering a consumer test drive. Real-time verification and authentication of a driver's license may allow automobile dealers to obtain lower premiums from insurance carriers.

Moreover, SRR device 102 may be used by a user to create reports based upon the data obtained by data capture device 104 and IDS 108 and stored on SRR database 122. Web application 105 preferably posts a reporting request form to display device 114. The user selects the type of report to create via user-input device 118, and reporting application 117 queries SRR database 122 through DBMS 125 for the data requested. Reporting application 117 then sorts the data, formats the data, and web application 105 displays the formatted, sorted data to display device 114 for user viewing. In addition, the user can print the reports to a user output device that includes a printer.

Figure 10:
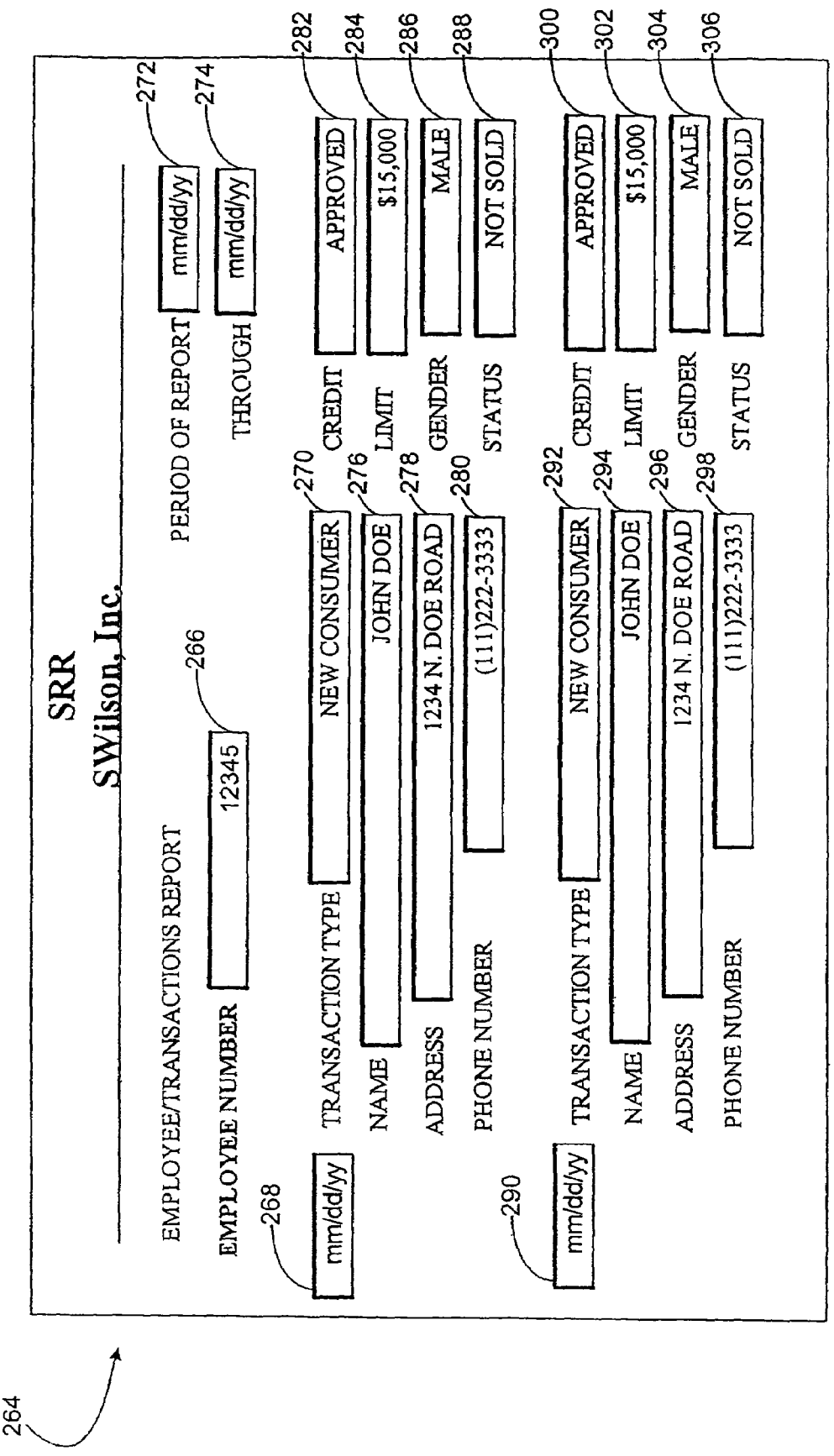
FIG. 10 is a web form used in connection with a preferred embodiment of the present invention for reporting "Employee/Transactions".

Reporting application 117 creates historical performance reports, for example a "Day of week/Gender" report as illustrated in FIG. 9 and an "Employee/Transactions" report as illustrated in FIG. 10. Management personnel to better plan for advertising, marketing, and selling can use these types of historical performance reports.

With reference to FIG. 9, a preferred embodiment of a "Day of Week/Gender" report 230 may include a reporting period as indicated by text fields 260 and 262. For the time period indicated, report 230 may indicate the number of males, as shown in text fields 232 through 244 for each day of the week and the number of females, as indicated by text fields 246 through 258. Management personnel may use this type of report in planning what type of products to use in giveaways. For example, if it appears that more women consumers enter the establishment on Saturdays and Sundays, then the incentives for the consumers may includes products attractive to women.

FIG. 10 illustrates a web form that may be used to report a listing of the number and type of transactions for a given employee on a selected time period. As shown in FIG. 10, a time period may be entered in text fields 272 and 274 and the employee number entered in text field 266. Report 264 may provide a listing of the transactions for the entered employee by date as indicated by text fields 268 and 290. Each transaction entry, for example 268 and 290, may comprise a transaction type 270, the customer identification data, including name 276, address 278, and phone number 280. In addition, report 264 may indicate a credit status 282 and limit 284, in addition to the consumer's gender 286 and status 288. Status 288 may indicate the point in the relationship between the company and the consumer, for example a new customer or a past purchaser. Management may use such a report 264 to make return calls to those consumers who have not yet made a purchase, or to evaluate an employee's productivity.

Operation

The preferred use and operation of SRR device 102 and associated SRR logic 106 are described hereafter with reference to FIGS. 3 through 8.

Figure 3:
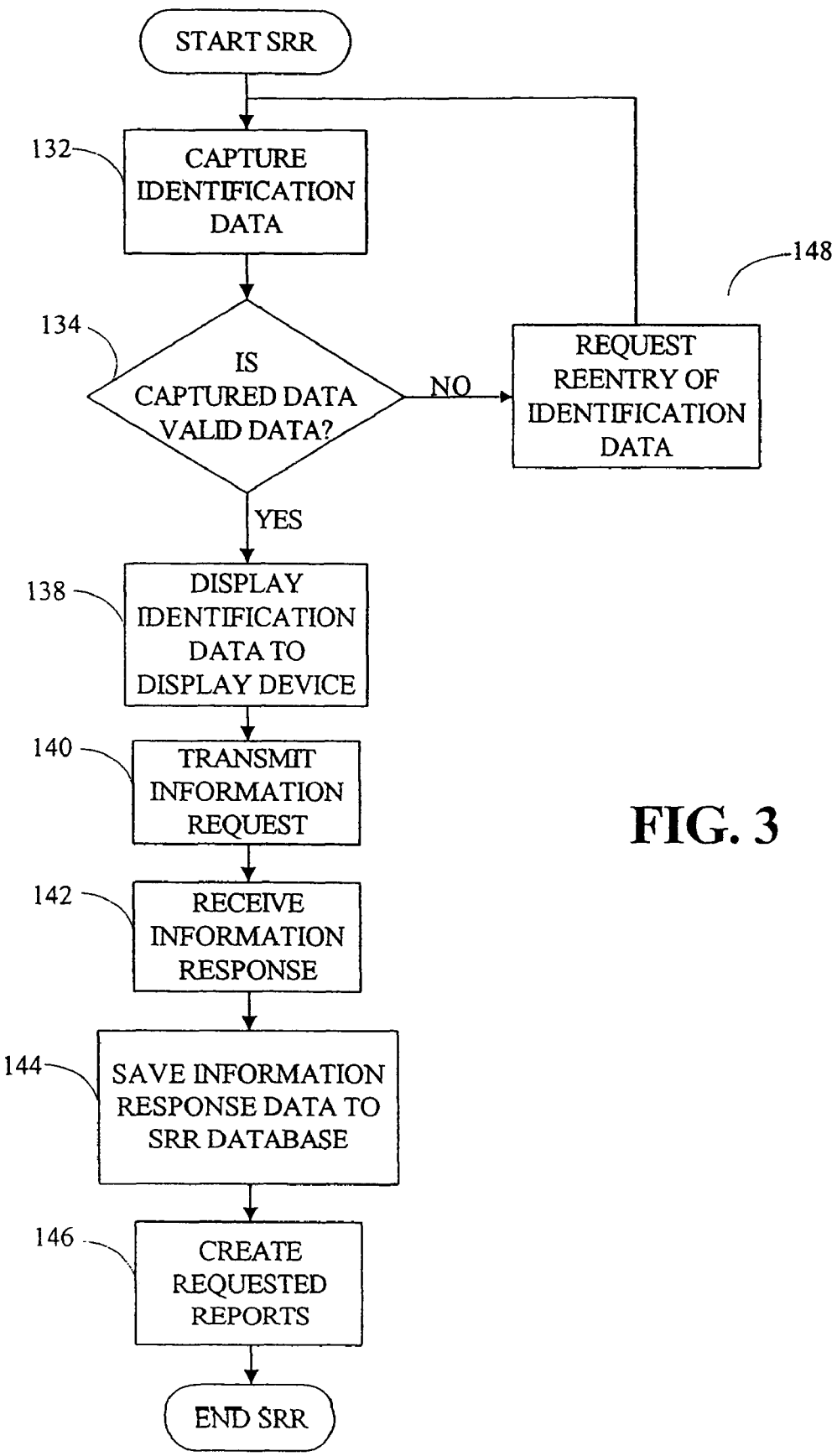
FIG. 3 is a flowchart illustrating a method of the SRR device as shown in FIG. 2 in accordance with a preferred embodiment of the present invention.

With reference to FIG. 3, identification data is captured by a data capture device 104 as indicated in block 132. It should be noted that in some alternative implementations, the functions noted in various blocks of FIG. 3 or any other of the accompanying flowcharts may occur out of the order in which they are depicted. For example, the respective functions of two blocks shown in succession in FIG. 3 may, in fact, be performed substantially concurrently. In other embodiments, the respective functions may be performed in the reverse order. As discussed hereinabove, the data can be captured using various technologies that allow a government-issued identification card to be captured electronically. This type of technology can include, but is not limited to, OCR scanners, bar code scanners, and magnetic strip readers. If the captured data is not valid, as indicated in block 134, then web application 105 displays the web form containing the identification information to display device 114, so that the user can identify the error in the identification data and reenter, as indicated in block 148.

If the data is valid, then web application 105 displays to display device 114 a web form containing the identification data and including a button that submits the identification data to an IDS 108, as indicated in block 138. The user elects to submit by activating the button via user-input device 118. Web application 105 then provides the user via a web form a selection of services provided by SRR device 102. The user then selects via user-input device 118 the type of service desired, for example a driver's license verification or credit approval.

SRR manager 103 then formats the data according to the type of service requested, and transmits an information request, that includes the identification data and the type of service requested, to IDS 108, as indicated in block 140. SRR manager 103 transmits the data via network interface 120 over network 112.

IDS 108 receives the information request, processes the data, then transmits over network 112 an information response that includes information responsive to the corresponding request. For example, if SRR manager 103 transmits a driver's license validation request to IDS 108, then IDS 108 transmits a request identifier and an indication of the validity of the driver's license. The request identifier is a data field that allows SRR manager 103 to verify the corresponding request to the response being received. SRR manager 103 receives the information response via network interface 120, as indicated in block 142.

Database application 101 saves the received information to SRR database 122, as indicated in block 144. The information is preferably stored, as indicated hereinabove, in a relational database that is suitable to the hardware and architecture employed in SRR device 102 and that is suitable for the traffic requirements of the system. As discussed further here, reporting application 117 creates reports from the data stored in SRR database 122 when a user selects particular report, as indicated in block 146. The relational database structure allows reporting application 117 to submit queries of SRR database 122 through DBMS 125. For example, reporting application 117 can request a report of all credit approval requests sent out over a given period of time.

As indicated hereinabove, data capture device 104 of the preferred embodiment of SRR device 102 includes an OCR scanner. An OCR scanner allows a user to scan a government issued identification card, for example a driver's license, and the data is stored in a retrievable format in data capture device database 121. FIGS. 4 through 8 describe the capture identification data process 132 in more detail in relation to the capture of data via an OCR scanner. As indicated in block 150, a user feeds a consumer's driver's license into an OCR scanner. The OCR scanner scans the driver's license as indicated in block 152 and stores the identification data representing the driver's license scanned in the OCR scanner database, as indicated in block 154.

As indicated in block 155, the data is displayed for user review in a display form 160 as illustrated in FIG. 5. The name of the consumer 162, the address of the consumer 164, the social security number of the consumer 166, the date of birth of the consumer 161, and the gender of the consumer 159 is displayed to the user for verification, as indicated in blocks 153 and 157.

Figure 4:
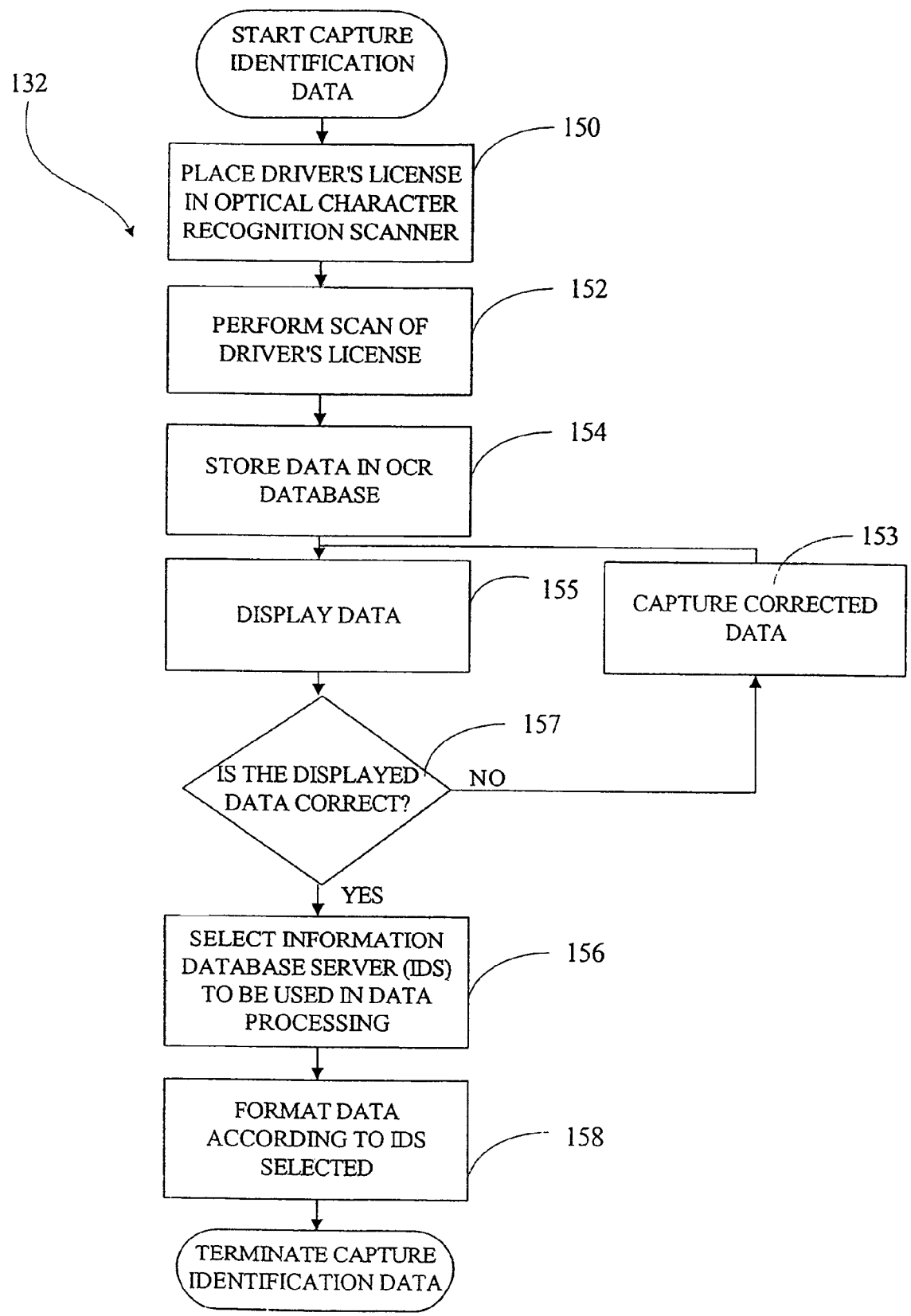
FIG. 4 is a flowchart illustrating the capture method as indicated in FIG. 3.
Figure 6:
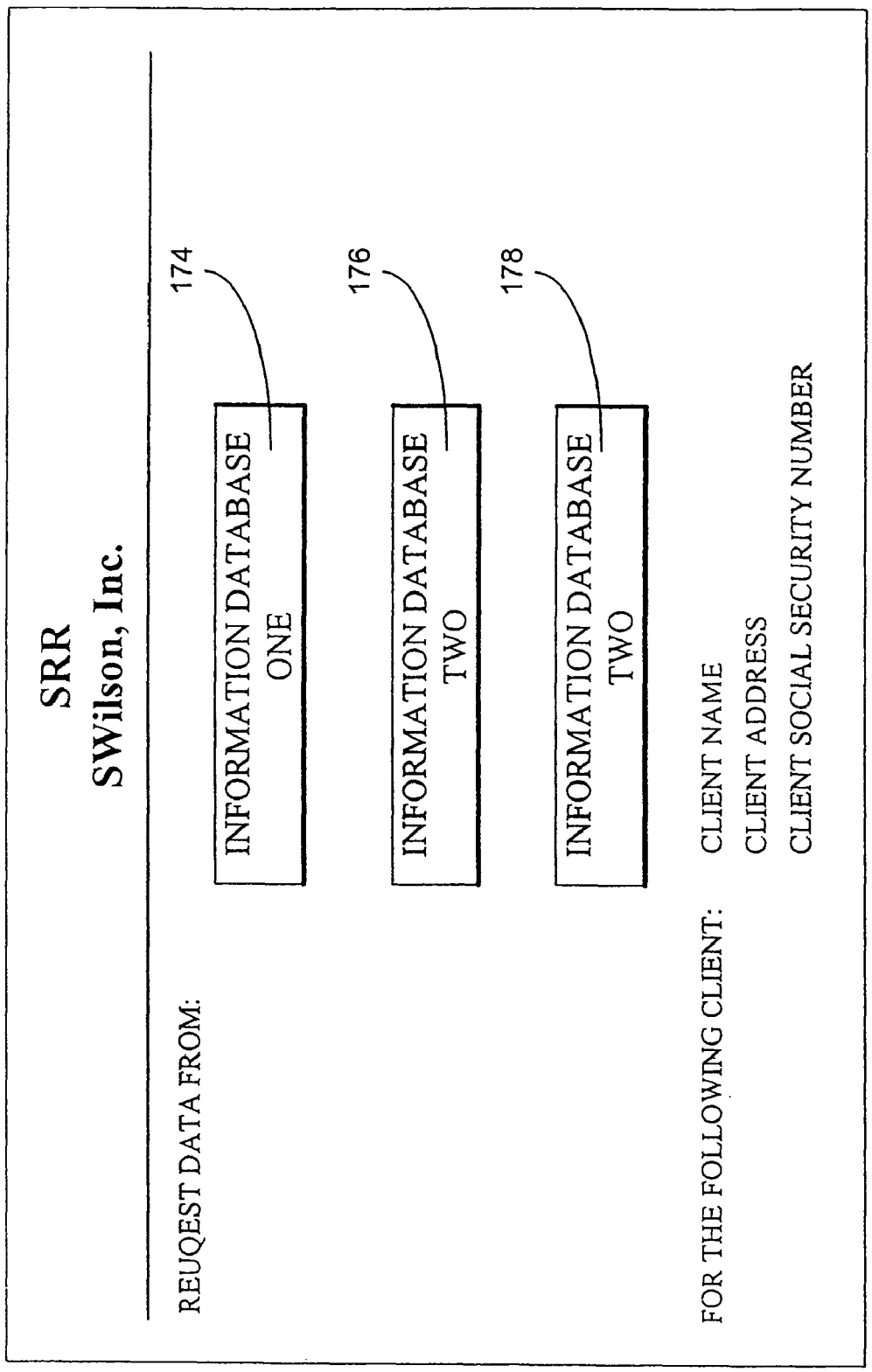
FIG. 6 is a web form used in connection with a preferred embodiment of the present invention for receiving an information database selection.

If the user selects the YES button 167, then, with reference to FIG. 4, the user selects the IDS to be used for a particular service desired by the user, as indicated in block 156. Correspondingly, a web form 172 as illustrated in FIG. 6 is displayed. Preferably, the user can select from a variety of services as represented by information database one 174, information database two 176, and information database three 178.

As indicated in block 158 of FIG. 4, once the user selects the service that is to be used to obtain an information response, then SRR manager 103 formats the data in accordance with the service selected. Remote information databases, such as IDS 108, generally provide to its clients a format specific to the database being used. SRR manager 103 then formats the data, accordingly.

In another embodiment, in addition to the information retrieved from data capture device 104 and IDS 108 information response, SRR logic 106 can further receive and store additional information in SRR database 122 for reporting purposes. Web application 105 can display an additional information request web form. For example, as indicated in the illustration of a web form 180 in FIG. 7, a user can enter an employee number 182 that can be associated with each transaction in which the user is involved. In addition, the user can enter information such as gender of a consumer 184, date of birth 186, product identification data 188, and additional comments 190. The user can enter this additional information into the web form via the user-input device 188 (FIG. 2).

Figure 8:
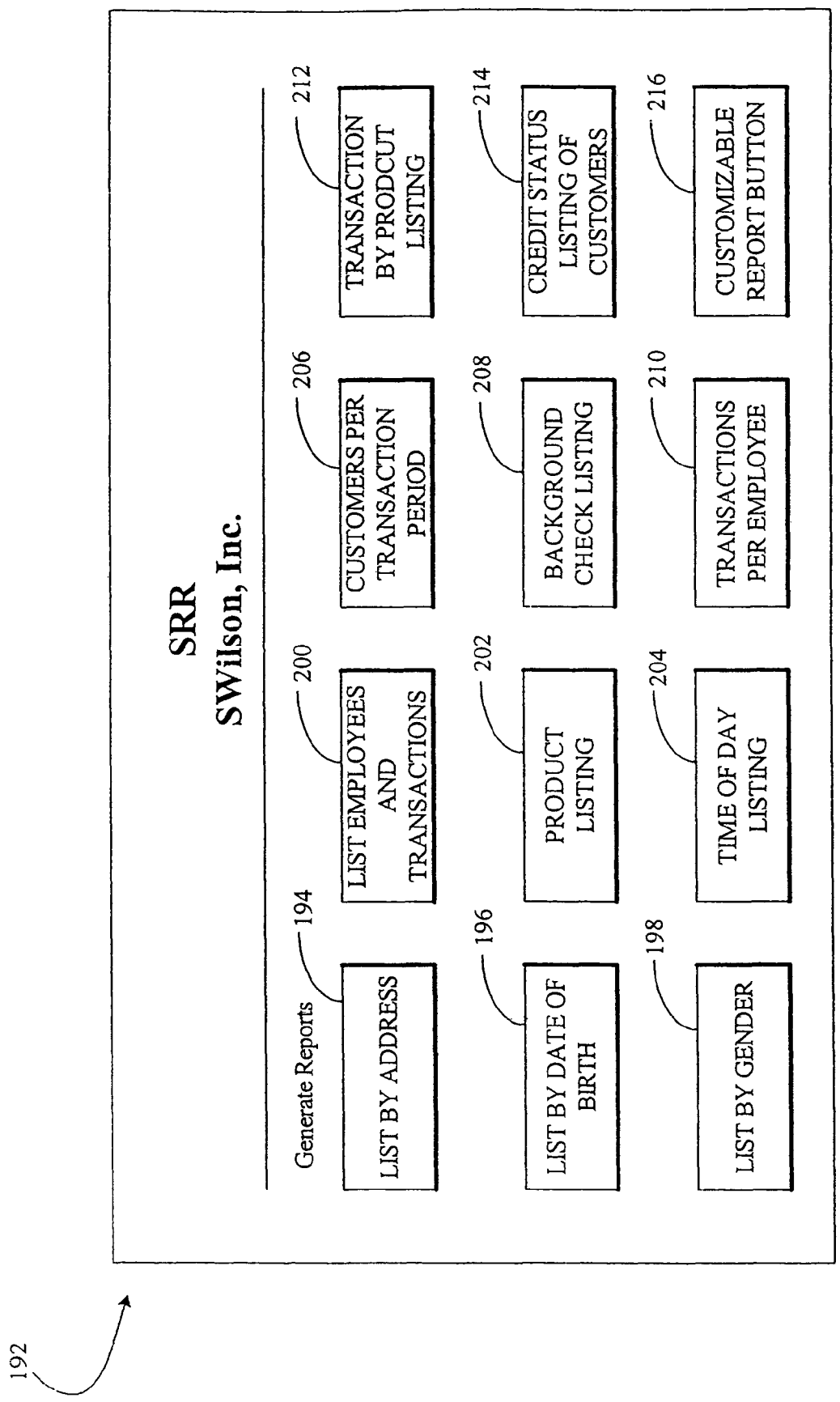
FIG. 8 is a web form used in connection with a preferred embodiment of the present invention for receiving a report selection.

In yet another embodiment of SRR device 102, SRR logic 106 can provide a reporting application that interfaces with web application 105. Web application 105 can display a web form 192 as illustrated in FIG. 8. Web form 192 can provide a user access to multiple reports, including but not limited to a listing of consumers by address 194, by date of birth 196, and by gender 198. In addition, reporting application 117 can access multiple pieces of data and create reports that list employee numbers and each employee's transaction activity as indicated in button 200. Reporting application 117 allows a user to determine what type of product consumers were most interested in by obtain a product listing for a particular time period as indicated by button 202. Reporting application 117 can compile additional reports, such as the number of consumers who were approved for credit during a given period as indicated by button 214, what products were involved in transactions as indicated by button 212, transactions per employee as indicated by block 210, and the consumers per transaction period as indicated by button 206. Further, button 216 can be customized to provide users with specific reports per user.

FIG. 9 and FIG. 10 illustrate a "Day of Week/Gender" report and an "Employee/Transactions" report, respectively. When a user selects button 198 (FIG. 8), the report as illustrated by FIG. 9 may be provided. The report 230 in FIG. 9 indicates a reporting period in text fields 260 and 262, and provides a breakdown of the gender of consumer per day of the week.

In addition, FIG. 10 provides a detailed transaction listing per employee. When a user selects button 210 (FIG. 8), report 264 may be displayed to show details about each transaction of an employee during an entered time period, as indicated in text fields 272 and 274. Report 264 may then provide a detailed listing of each transaction for the employee number in text field 266.

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A system comprising:
   a data capture device configured to capture identification data from a card having a plurality of identification data elements such that the identification data captured by the data capture device from the card includes the identification data elements; and
   scan, record, and report (SRR) logic configured to receive the identification data from the data capture device and to receive service requests pertaining to the card from a user of the data capture device;
   the SRR logic further configured to select a first set of the identification data elements of the identification data in response to receiving a first service request of a first type, format the first set of identification data elements according to a first predetermined format associated with a first recipient responsible for handling the first service request, and transfer the formatted first set of identification data elements along with the first service request to the first recipient responsible for handling the first service request;
   the SRR logic further configured to select a second set of the identification data elements of the identification data different than the first set of identification data elements in response to receiving a second service request of a second type different than the first type, format the second set of identification data elements according to a second predetermined format associated with a second recipient responsible for handling the second service request, and transfer the formatted second set of identification data elements along with the second service request to the second recipient responsible for handling the second service request.

2. The system of claim 1 wherein:
the data capture device includes an optical character recognition (OCR) scanner configured to capture identification data from the card.

3. The system of claim 1 wherein:
the data capture device includes a magnetic reader configured to capture identification data from the card.

4. The system of claim 1 wherein:
the data capture device includes a bar code reader configured to capture identification data from the card.

5. The system of claim 1 wherein:
the card is a government-issued identification card.

6. The system of claim 1 wherein:
the card is a driver license identification card.

7. The system of claim 1 wherein:
the card is a credit card.

8. The system of claim 1 wherein:
the SRR logic, the first recipient, and the second recipient are remotely located from one another;
wherein the SRR logic is configured to transfer the formatted first set of identification data elements along with the first service request over a communications network to the first recipient and is configured to transfer the formatted second set of identification data elements along with the second service request over the communication network to the second recipient.

9. The system of claim 8 wherein:
the first recipient is a personal data verification recipient and the first service request pertains to whether the identification data of the card is valid;
wherein the second recipient is a credit approval recipient and second service request pertains to whether the card has approval for satisfying a payment.

10. The system of claim 1 wherein:
the SRR logic is further configured to receive a first response to the first service request from the first recipient and to receive a second response to the second service request from the second recipient.

11. A method comprising:
capturing identification data by a data capture device from a card having a plurality of identification data elements such that the captured identification data includes the identification data elements;
receiving by scan, record, and report (SRR) logic the captured identification data from the data capture device;
selecting by the SRR logic a first set of the identification data elements of the captured identification data in response to receiving a first service request pertaining to the card from a user of the data capture device, wherein the first service request is of a first type;

formatting by the SRR logic the first set of identification data elements according to a first predetermined format associated with a first recipient responsible for handling the first service request;

transferring the formatted first set of identification data elements along with the first service request from the SRR logic to the first recipient responsible for handling the first service request;

selecting by the SRR logic a second set of the identification data elements of the captured identification data different than the first set of identification data elements in response to receiving a second service request pertaining to the card from a user of the data capture device, wherein the second service request is of a second type different than the first type;

formatting by the SRR logic the second set of identification data elements according to a second predetermined format associated with a second recipient responsible for handling the second service request; and transferring the formatted second set of identification data elements along with the second service request from the SRR logic to the second recipient responsible for handling the second service request.

12. The method of claim 11 wherein:
capturing identification data of the card includes optical character recognition (OCR) scanning of the card.

13. The method of claim 11 wherein:
capturing identification data of the card includes magnetic reading of the card.

14. The method of claim 11 wherein:
capturing identification data of the card includes bar code reading of the card.

15. The method of claim 11 wherein:
the card is a government-issued identification card.

16. The method of claim 11 wherein:
the card is a driver license identification card.

17. The method of claim 11 wherein:
the card is a credit card.

18. The method of claim 11 wherein:
transferring the formatted first set of identification data elements along with the first service request from the SRR logic to the first recipient includes communicating over a network between the SRR logic and the first recipient; and transferring the formatted second set of identification data elements along with the second service request from the SRR logic to the second recipient includes communicating over a network between the SRR logic and the second recipient.

19. The method of claim 18 wherein:
the first recipient is a personal data verification recipient and the first service request pertains to whether the identification data of the card is valid;

wherein the second recipient is a credit approval recipient and second service request pertains to whether the card has approval for satisfying a payment.

20. The method of claim 11 further comprising:
receiving by the SRR logic a first response to the first service request from the first recipient; and receiving by the SRR logic a second response to the second service request from the second recipient.

* * * * *